United States Patent
Vityaev

(10) Patent No.: US 7,469,373 B2
(45) Date of Patent: Dec. 23, 2008

(54) APPLICATION OF A META-VITERBI ALGORITHM FOR COMMUNICATION SYSTEMS WITHOUT INTERSYMBOL INTERFERENCE

(75) Inventor: Andrei E. Vityaev, San Jose, CA (US)

(73) Assignee: Broadcom Corporation, Irvine, CA (US)

(*) Notice: Subject to any disclaimer, the term of this patent is extended or adjusted under 35 U.S.C. 154(b) by 320 days.

(21) Appl. No.: 11/059,875

(22) Filed: Feb. 17, 2005

(65) Prior Publication Data

US 2006/0195771 A1    Aug. 31, 2006

(51) Int. Cl.
*H03M 13/41*    (2006.01)
*H03M 13/45*    (2006.01)

(52) U.S. Cl. ..................... 714/780; 714/795
(58) Field of Classification Search .......... 714/780, 714/794, 795
See application file for complete search history.

(56) References Cited

U.S. PATENT DOCUMENTS

| | | | |
|---|---|---|---|
| 5,081,651 A | | 1/1992 | Kubo |
| 5,208,816 A | * | 5/1993 | Seshardi et al. ............ 714/795 |
| 5,291,499 A | | 3/1994 | Behrens et al. |
| 5,430,739 A | | 7/1995 | Wei et al. |
| 5,457,704 A | * | 10/1995 | Hoeher et al. ............... 714/794 |
| 5,511,081 A | * | 4/1996 | Hagenauer ................... 714/795 |
| 5,577,053 A | * | 11/1996 | Dent .......................... 714/755 |
| 5,682,395 A | * | 10/1997 | Begin et al. ................. 714/793 |
| 5,848,106 A | * | 12/1998 | Khayrallah ................. 375/340 |
| 5,850,405 A | * | 12/1998 | Wimmer et al. ............. 714/790 |
| 6,009,552 A | * | 12/1999 | Ariel et al. .................. 714/780 |
| 6,307,901 B1 | | 10/2001 | Yu et al. |
| 6,427,220 B1 | | 7/2002 | Vityaev |
| 6,732,328 B1 | * | 5/2004 | McEwen et al. ............. 714/795 |
| 6,765,507 B2 | | 7/2004 | Yokokawa et al. |

OTHER PUBLICATIONS

Reed, I., et al., "The VLSI Design of an Error-Trellis Syndrome Decoder for Certain Convolutional Codes", IEEE Transactions on Computers, vol. C-35, No. 9, Sep. 1986, pp. 781-789.*
Sidorenko, V., et al., "Decoding of Convolutional Codes Using a Syndrome Trellis", IEEE Transactions on Information Theory, vol. 40, No. 5, Sep. 1994, pp. 1663-1666.*
Ariel, M., et al., "Soft Syndrome Decoding of Binary Convolutional Codes", IEEE Transactions on Communications, vol. 43, No. 2/3/4, Feb./Mar./Apr. 1995, pp. 288-297.*

(Continued)

*Primary Examiner*—Stephen M Baker
(74) *Attorney, Agent, or Firm*—McAndrews, Held & Malloy Ltd.

(57) ABSTRACT

Herein described is a system and a method of detecting and correcting data bit errors using a sequence of one or more codewords transmitted through a communication channel without intersymbol interference. Each of the one or more codewords incorporates or encodes one or more parity bits. The codewords are processed by a Non-ISI Meta-Viterbi detector that utilizes a Meta-Viterbi algorithm. The Non-ISI Meta-Viterbi detector comprises an event weight processor, a computational circuitry, a parity syndrome calculator, and an error correction circuitry. The Non-ISI Meta-Viterbi detector receives an output generated from a symbol detector and processes the received output using a trellis having $2^r$ states. In a representative embodiment, the Non-ISI Meta-Viterbi detector performs $\chi + 2^r 2^r$ add, compare, and select operations.

18 Claims, 7 Drawing Sheets

OTHER PUBLICATIONS

Lee, L., et al., "Scarce-State-Transition Error-Trellis Decoding of Binary Block Codes", IEE 'Telecommunications' Conference Publication No. 404, Mar. 1995, pp. 97-99.*

Lee, L., et al., "Scarce-State-Transition Syndrome-Former Error-Trellis Decoding of (n, n-1) Convolutional Codes", IEEE Transactions on Communications, vol. 44, No. 1, Jan. 1996, pp. 7-9.*

Ariel, M., et al., "Minimal Error-Trellises for Linear Block Codes", ISIT, Aug. 1998, pp. 228.*

Ariel, M., et al., "Error trellises for Convolutional Codes—Part II: Decoding Methods", IEEE Transactions on Communications, vol. 47, No. 7, Jul. 1999, pp. 1015-1024.*

Tajima, M., et al., "On the Eqivalence Between Scarce-State-Transition Viterbi Decoding and Syndrome Decoding of Convolutional Codes", ISIT, Jun. 2003, p. 304.*

Tajima, M., et al., "Relation Between Encoder and Syndrome Former Variables and Symbol Reliability Estimation Using a Syndrome Trellis", IEEE Transactions on Communications, vol. 51, No. 9, Sep. 2003.*

Wadayama, T., "An Algorithm for Calculating the Exact Bit Error Probability of a Binary Linear Code Over the Binary Symmetric Channel", IEEE Transactions on Information Theory, vol. 50, No. 2, Feb. 2004, pp. 331-337.*

Roy D. Cideciyan, Jonathan D. Coker, Evangelos Eleftheriou, and Richard L. Galbraith, Noise Predictive Maximum Likelihood Detection Combined with Parity-Based Post-Processing, IEEE Transactions on Magnetics, vol. 37, No. 2, Mar. 2001, pp. 714-720, The Institute of Electrical & Electronics Engineers, USA.

Z.A. Keirn, Victor Y. Krachkovsky, Erich R. Haratsch, and Harley Burger, Use of Redundant Bits for Magnetic Recording: Single-Parity Codes and Reed-Solomon Error-Correcting Code, IEEE Transactions on Magnetics, vol. 40, No. 1, Jan. 2004, pp. 225-230, The Institute of Electrical & Electronics Engineers, USA.

Jeff L. Sonntag and Bane Vasic, Implementation and Bench Characterization of a Read Channel with Parity Check Postprocessor, Digests of The Magnetic Recording Conference 2000 (TMRC 2000), Santa Clara, CA, 2000, 2 pages, The Institute of Electrical & Electronics Engineers, USA.

Feng, W., et al., "On the Performance of Parity Codes in Magnetic Recording Systems", 2000, pp. 1877-1881, The Institute of Electrical & Electronics Engineers, USA.

Kavcic, A., et al., "Maximum Likelihood Sequence Estimation in Channels with Intersymbol Interference and Noise Memory", Aug. 1998, 1 page, ISIT 1998, Cambridge, MA, USA.

Dholakia, A., et al., "Capacity-Approaching Codes: Can They Be Applied to the Magnetic Recording Channel?", Feb. 2004, pp. 122-130, IEEE Communication Magazine, The Institute of Electrical & Electronics Engineers, USA.

Vityaev, A., et al., "Measurement and Modeling of System-Level Read-Channel Performance", Dec. 2000, pp. 30-33, Data Storage Magazine, USA.

Forney, G.D., "The Viterbi Algorithm", Proceedings of the IEEE, Mar. 1, 1973, vol. 61, No. 3, pp. 268-278, XP000573242, ISSN: 0018-9219, IEEE, New York, NY, USA.

Eleftheriou, E., et al., "Improving Performance of PRML/EPRML Through Noise Prediction", Sep. 1996, vol. 32, No. 5, pp. 3968-3970, XP002370660, IEEE Transactions on Magnetics, Sep. 1996.

* cited by examiner

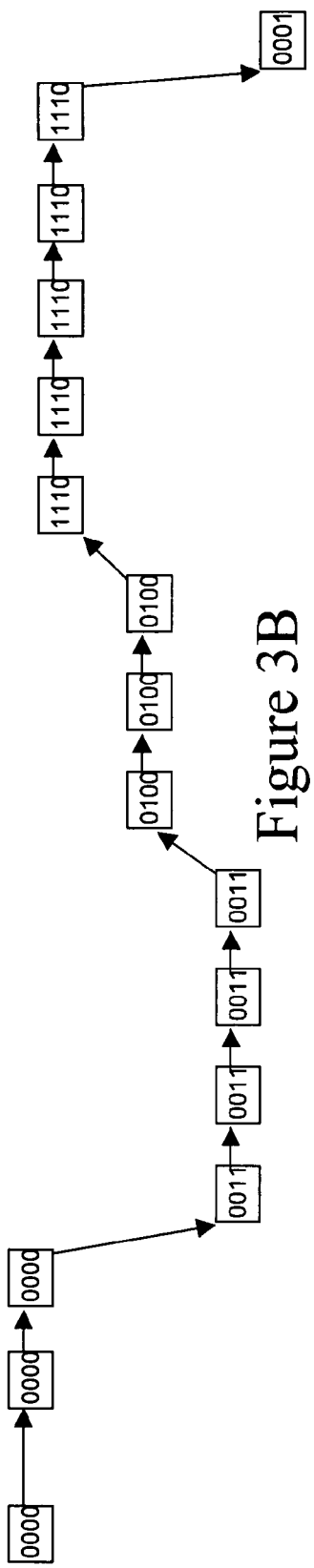

Set of Error Events: {e₃, e₇, e₁₀, e₁₅}

| Sequence | No e₁ | No e₂ | e₃ | No e₄ | No e₅ | No e₆ | e₇ | No e₈ | No e₉ | e₁₀ | No e₁₁ | No e₁₂ | No e₁₃ | No e₁₄ | e₁₅ |
|---|---|---|---|---|---|---|---|---|---|---|---|---|---|---|---|
| Event Parity | -- | -- | 0011 | -- | -- | -- | 0111 | -- | -- | 1010 | -- | -- | -- | -- | 1111 |
| Event Weight | -- | -- | w(e₃) | -- | -- | -- | w(e₇) | -- | -- | w(e₁₀) | -- | -- | -- | -- | w(e₁₅) |
| Cumulative Parity (state) | 0000 | 0000 | 0011 | 0011 | 0011 | 0011 | 0100 | 0100 | 0100 | 1110 | 1110 | 1110 | 1110 | 1110 | 0001 |
| Cumulative Weight (path metric) | 0 | 0 | w(e₃) | w(e₃) | w(e₃) | w(e₃) | w(e₃)+ w(e₇) | w(e₃)+ w(e₇) | w(e₃)+ w(e₇) | w(e₃)+ w(e₇)+ w(e₁₀) | w(e₃)+ w(e₇)+ w(e₁₀) | w(e₃)+ w(e₇)+ w(e₁₀) | w(e₃)+ w(e₇)+ w(e₁₀) | w(e₃)+ w(e₇)+ w(e₁₀) | w(e₃) + w(e₇) + w(e₁₀) + w(e₁₅) |

Figure 3A

Path Through 16-State Meta-Trellis:

Figure 3B

APPLICATION OF A META-VITERBI ALGORITHM FOR COMMUNICATION SYSTEMS WITHOUT INTERSYMBOL INTERFERENCE

CROSS-REFERENCE TO RELATED APPLICATIONS/INCORPORATION BY REFERENCE

This application makes reference to:

U.S. application Ser. No. 11/049,769, entitled "META-VITERBI ALGORITHM FOR USE IN COMMUNICATION SYSTEMS", filed Feb. 3, 2005.

The above stated application is hereby incorporated herein by reference in its entirety.

FEDERALLY SPONSORED RESEARCH OR DEVELOPMENT

Not Applicable

MICROFICHE/COPYRIGHT REFERENCE

Not Applicable

BACKGROUND OF THE INVENTION

It is well known that the Viterbi algorithm may be used for the maximum likelihood detection of data. In the absence of intersymbol interference and when using the linear block coding rate $(\chi-t)/\chi$, the detection of data may be accomplished by using a Viterbi detector with $2^t$ states. However, when using linear block coding of rate $(\chi-t)/\chi$, in which t bits of parity are encoded in a codeword of length $\chi$, the Viterbi algorithm requires performing $\chi 2^t$ ($\chi$ times $2^t$) add, compare, select (ACS) operations. Unfortunately, performing a large number of ACS operations is sub-optimal since the implementation complexity also increases.

The limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Various aspects of the invention provide a system and/or method for detecting and correcting one or more data bit errors transmitted through a communication channel, wherein the communication channel does not exhibit any intersymbol interference, substantially as shown in and/or described in connection with at least one of the following figures, as set forth more completely in the claims.

These and other advantages, aspects, and novel features of the present invention, as well as details of illustrated embodiments, thereof, will be more fully understood from the following description and drawings.

BRIEF DESCRIPTION OF THE DRAWINGS

FIG. 3A is a table illustrating the computation of cumulative parity and cumulative weight of a subset of error events (subset of H={$e_1,e_2,\ldots,e_{15}$}) associated with a four-bit parity codeword, in accordance with an embodiment of the invention.

FIG. 3B is a diagram illustrating the 16 state Meta-Viterbi trellis path taken when the error events chosen correspond to {$e_3, e_7, e_{10}, e_{15}$}, as described in relation to FIG. 3A, in accordance with an embodiment of the invention.

DETAILED DESCRIPTION OF THE INVENTION

Figure 1A:
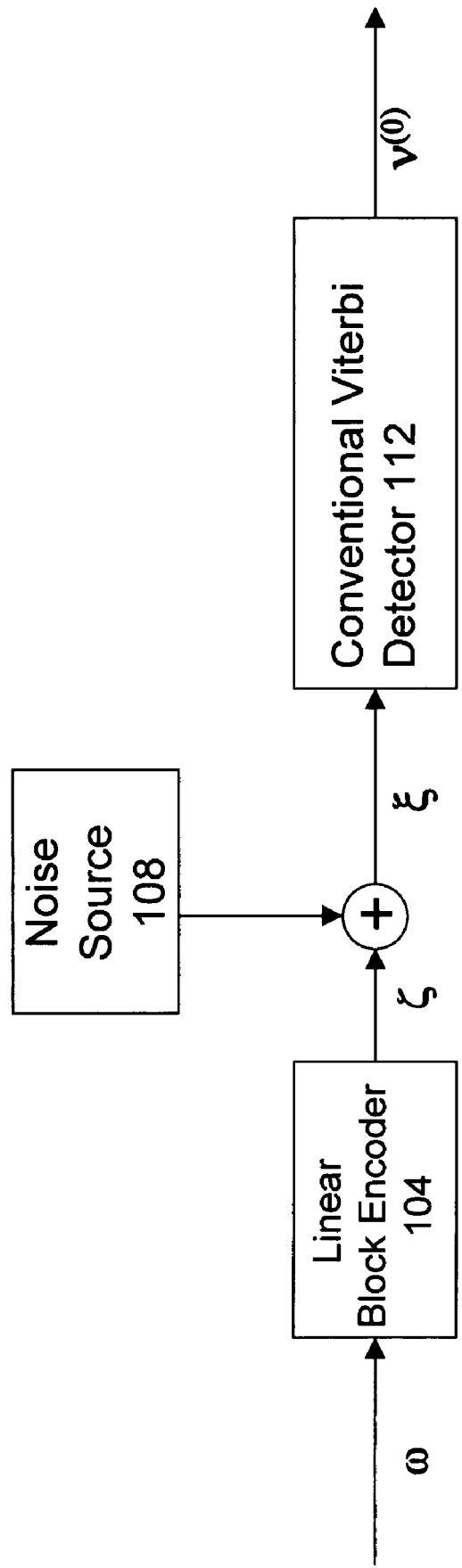
FIG. 1A is a functional block diagram of an error detection and correction system that utilizes a conventional Viterbi Algorithm to decode a linear block code transmitted through a communication channel, in the absence of intersymbol interference (ISI).

Various aspects of the invention provide a system and method of detecting and correcting data bit errors that occur when a data stream is transmitted through a communication channel. The data bit errors may be detected and corrected by way of transmitting a sequence of codewords. The codewords may incorporate or encode one or more parity bits into the transmitted data. The codewords are used in the detection and correction process to recover the data transmitted. The method as described herein utilizes what is referred to as a Meta-Viterbi Algorithm for use in communication channels that do not exhibit intersymbol interference (ISI). Hereinafter, this method may be termed or referred to as a Meta-Viterbi Algorithm. The system that performs the detection and correction as described herein may be termed a symbol detector and Non-ISI Meta-Viterbi detector.

In a representative embodiment, the channel may comprise a wireline communications channel. In another representative embodiment, the channel may comprise any communications transmission channel in which ISI is absent. Aspects of the invention provide performance that is equivalent to that provided by using the Viterbi Algorithm with $2^t$ states. However, various aspects of the invention provide a significant reduction in implementation complexity compared with that provided by using the Viterbi Algorithm to detect codewords. When using the Viterbi Algorithm having codeword length $\chi$ and t parity bits that results in a linear block coding of rate $(\chi-t)/\chi$, maximum likelihood detection requires the use of $2^t$ states run over $\chi$ steps. In terms of implementation complexity, the Viterbi algorithm requires performing a total of $\chi 2^t$ ($\chi$ multiplied by $2^t$) add, compare, select (ACS) operations. In contrast, the Meta-Viterbi Algorithm may be performed using only a total of $\chi+2^t 2^t$ or $\chi+2^{2t}$ operations.

Various aspects of the invention implement at least a method and a system of determining an optimum set of one or more error events associated with a parity syndrome of a transmitted codeword. Each transmitted codeword is associated with an optimal set of one or more error events. The set of error events may be used to correct the codeword by way of using its parity syndrome. The optimal set of one or more error events is associated with a minimum cumulative event weight computed by a path formed from the decision branches of a trellis diagram. The path traverses one or more steps corresponding to the error events associated with the codeword. The set of error events may be determined by using the parity syndrome and cumulative parity of the codeword. A path or route is taken over a decision tree or trellis diagram by way of one or more decision branches. The branch taken corresponds to whether a particular error event occurs in a codeword. Each of the one or more paths is associated with an event weight. The cumulative weight may be found by summing the event weights of the branches used to create the path of a codeword. The path with the smallest cumulative weight is chosen as the optimal solution for correcting the codeword. Consequently, the set of error events associated with this path is used to correct the received codeword. The cumulative parity at the last step of the path may coincide with the parity syndrome of the received codeword.

FIG. 1A is a functional block diagram of an error detection and correction system that utilizes a conventional Viterbi Algorithm to decode a linear block code transmitted through a communication channel, in the absence of intersymbol interference (ISI). The system comprises a linear block encoder 104, a noise source 108, and a conventional Viterbi detector 112. As illustrated, a block of bits, $\omega=(\omega_1, \ldots, \omega_{\chi-t})$, comprising $(\chi-t)$ bits is input into a linear block encoder 104 prior to transmission through the communication channel. The linear block encoder 104 outputs a codeword, $\zeta=(\zeta_1, \ldots, \zeta_\chi)$, that contains a total of $\chi$ bits. One may denote a linear operator that generates a parity syndrome for each codeword: $\Phi: \{0,1\}^\chi \to \{0,1\}^t$. Since the codeword is typically transmitted through a noisy communication channel, a noise source 108 is applied to the communication channel. In a representative embodiment, the noise source 108 may generate independent identically distributed noise into the communication channel. In yet another representative embodiment that is not illustrated, data-dependent noise may be added to the communication channel. In the embodiment illustrated in FIG. 1A, the noise output by the noise source 108 is added to the codeword, $\zeta$, such that a codeword, $\xi$, is input into a conventional Viterbi detector 112. The sequence of codewords received by the Viterbi detector 112 is represented by the variable $\xi \in R^\chi$. The Viterbi detector 112 utilizes $2^t$ states over $\chi$ steps in the detection and correction process. The Viterbi detector 112 determines a corrected codeword $v^{(0)}$, given by the equation:

$$v^{(0)} = \operatorname*{argmax}_{x \in \Xi} P(\xi|x), \text{ where } \Xi = \{x \in \{0,1\}^\chi | \Phi(x) = 0\}.$$

In the absence of ISI in the communication channel and with noise that is independent and identically distributed, $$\log P(\xi|x) = \sum_{i=1}^{i=\chi} \log P(\xi_i|x_i).$$

Figure 1B:
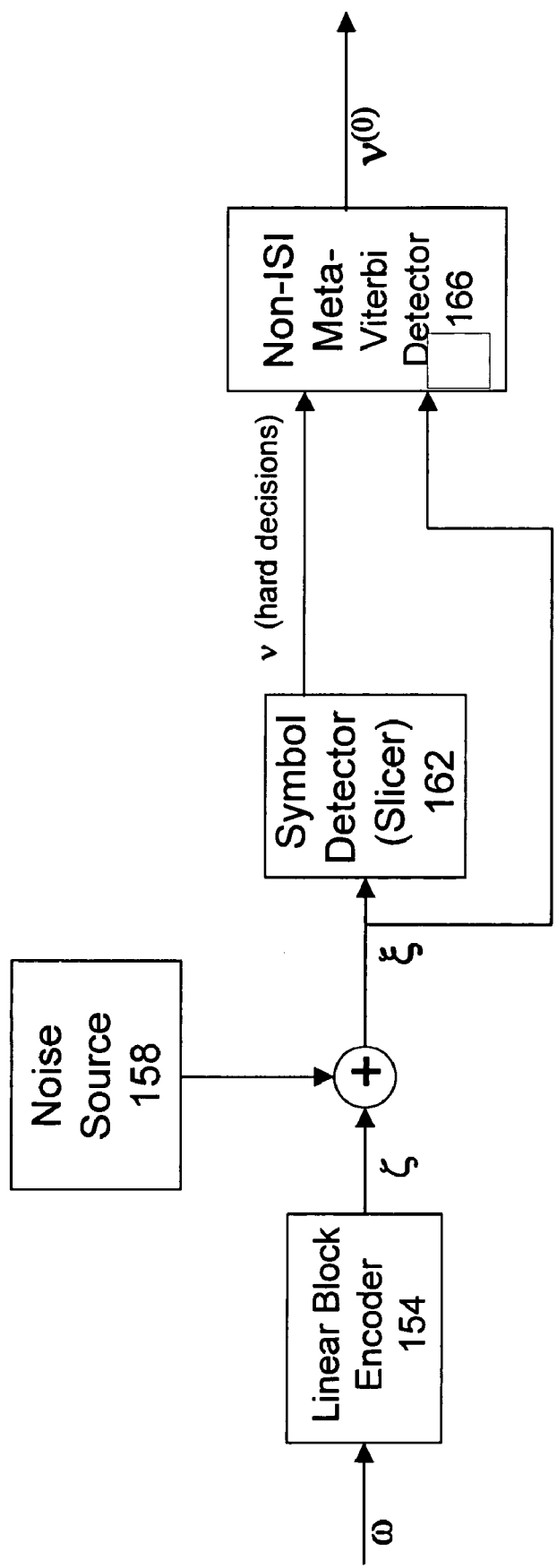
FIG. 1B is a functional block diagram of a system that utilizes the Meta-Viterbi Algorithm in accordance with an embodiment of the invention.

FIG. 1B is a functional block diagram of a system that utilizes the Meta-Viterbi Algorithm in accordance with an embodiment of the invention. In a representative embodiment, the system may comprise a wireline data communications channel that corrects one or more data bit errors of one or more codewords by way of utilizing the Meta-Viterbi Algorithm. Of course, the system may comprise any type of communication channel without intersymbol interference. As illustrated, the system comprises a linear block encoder 154, a noise source 158, a symbol detector 162, and a Non-ISI Meta-Viterbi detector 166. Aspects of the invention provide that the system shown in FIG. 1B processes codewords in a more efficient manner by way of adding t bits of redundancy to each codeword, and allowing the Non-ISI Meta-Viterbi detector 166 to process the codewords using $2^t$ states. Linear block coding may be used at the transmitter, for example, to generate codewords having t bits of parity. Compared to the system described in FIG. 1A, the system in FIG. 1B replaces the Viterbi detector with the symbol detector 162 and the Non-ISI Meta-Viterbi detector 166. As illustrated, a block of bits, $\omega=(\omega_1, \ldots, \omega_{\chi-t})$, containing $(\chi-t)$ bits is input into the linear block encoder 154 prior to transmission through the communication channel. The linear block encoder 154 outputs a codeword, $\zeta=(\zeta_1, \ldots, \zeta_\chi)$, contains a total of $\chi$ bits. One may denote a linear operator that generates a parity syndrome for each codeword: $\Phi: \{0,1\}^\chi \to \{0,1\}^t$. Since the codeword is typically transmitted through a noisy communication channel, a noise source 158 is applied to the communication channel. In a representative embodiment, the noise source 158 may generate independent identically distributed noise into the communication channel. The noise output by the noise source 158 is added to the codeword, $\zeta$, such that a codeword, $\xi$, is input into the symbol detector 162. The symbol detector 162 provides an output, referred to as a hard decision output that is used by the Non-ISI Meta-Viterbi detector 166, for example. In a representative embodiment, a slicer makes a decision by quantizing a received sample to a particular value. The value provides an estimate of the actual transmitted sample. The hard decision output provided by the symbol detector 162, $v$, may be defined by the following equation:

$$v = \operatorname*{argmax}_{x \in \{0,1\}^\chi} \log P(\xi|x) = \operatorname*{argmax}_{x \in \{0,1\}^\chi} \sum_{i=1}^{i=\chi} \log P(\xi_i|x_i).$$

The hard decision output is used by the Non-ISI Meta-Viterbi detector 166 to generate a soft decision output that may be expressed using the following equation:

$$w(e) = \log P(\xi|v) - \log P(\xi|v+e)$$

The event weights, w(e), may be determined using the previously defined equation. As discussed later, the soft decision output may be generated by using an event weight processor located within the Non-ISI Meta-Viterbi detector 166. The soft decision output may be expressed as follows: log $P(\xi_i|v_i)$–log $P(\xi_i|\bar{v}_i)$, for i=1, ..., $\chi$, in which $\bar{v}_i$ denotes the complement of the bit $v_i$. In the case of additive white Gaussian noise (AWGN), this soft decision output is equal to $-(\xi_i-v_i)^2+(\xi_i-\bar{v}_i)^2$. The parity syndrome, $\pi=\Phi(v)$, of the received codeword may be computed by the Non-ISI Meta-Viterbi detector 166. The Non-ISI Meta-Viterbi detector 166 utilizes the hard and soft decision outputs to determine the optimum set of error events for the received codeword. The error events are used by the Non-ISI Meta-Viterbi detector 166 to determine the corrected output, $v^{(0)}$ using v. One may define an error event to be a bit sequence of length $\chi$, comprising a single non-zero element such that $v+e \in \{0,1\}^\chi$, in which the operator "+" denotes conventional arithmetic addition. Various aspects of the present invention provide for an error event, comprising a single bit error, to be specified simply by its bit location within the received codeword. The single bit error event may be expressed in terms of a vector and the set of all possible error events may be specified by the variable $G^*(v)$:

$$G^*(v)=\{e(D)=\pm D^i|v+e\in\{0,1\}^\chi\}$$

The Non-ISI Meta-Viterbi detector 166 determines the probability of an error event occurring by way of computing one or more event weights, $w(e)$. Since aspects of the invention consider a communication channel with no ISI, the weight of an error event is based on soft information (i.e, the soft decision output provided by the event weight processor) at the location of the single bit error. However, for the purposes of explaining the Meta-Viterbi algorithm, it is sufficient to simply assume that some strictly positive function $w: G^*(v)\rightarrow(0, \infty)$ exists that maps to positive values. The Non-ISI Meta-Viterbi detector 166 determines the set of error events $E=\{e_1, e_2, \ldots, e_n\}$, $E \subset G^*(v)$, such that it corrects the parity syndrome, $\Phi(E):=\Phi(e_1)\oplus\Phi(e_2)\oplus\ldots\oplus\Phi(e_n)=\pi$, of the received codeword and has minimum weight, $$w(E) := \sum_{e \in E} w(e).$$

The Non-ISI Meta-Viterbi detector 166 generates an output that corresponds to the output of a Viterbi detector using 2t states. The output of the Non-ISI Meta-Viterbi detector 166 may be represented by the following equation which indicates that the hard decision output is added to one or more error events to provide a corrected output:

$$v^{(0)} = v + \sum_{e \in E} e$$

Figure 2:
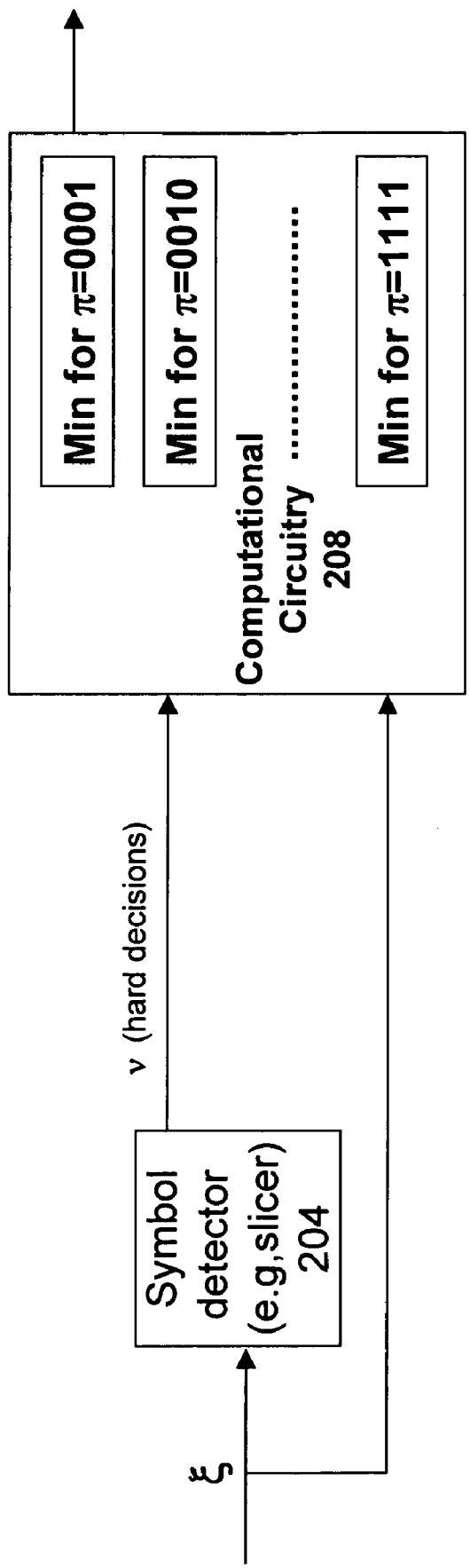
FIG. 2 is a functional block diagram describing a computational circuitry of a Non-ISI Meta-Viterbi detector that is used in determining a preferred set of error events, in accordance with an embodiment of the invention.

FIG. 2 is a functional block diagram describing a computational circuitry 208 of a Non-ISI Meta-Viterbi detector (e.g., 166 of FIG. 1B) that is used in determining a preferred set of error events, in accordance with an embodiment of the invention. The Non-ISI Meta-Viterbi detector comprises the computational circuitry 208. The computational circuitry 208 determines the error events $e\in E$ and $\Phi(e)=\pi\neq 0$, such that:

$$e = \underset{x \in \Omega}{\arg\min}\ w(x), \text{ where } \Omega = \{x \in G^*(v), \Phi(x) = \pi\}$$

As illustrated in FIG. 2, the symbol detector (e.g., slicer) 204 outputs a hard decision output, v, into the computational circuitry 208. Additionally, the noisy codeword, $\xi$, is input into the symbol detector 204 and the computational circuitry 208. The computational circuitry 208 determines the preferred error events that have the smallest event weight for each possible parity syndrome, given t parity bits or $2^t$ states. In FIG. 2, the computational circuitry 208 may also record the parity syndrome values associated with one or more codewords. The embodiment of FIG. 2 illustrates how the computational circuitry 208 determines a preferred set of error events when a four-bit parity code is used for each codeword. In this representative embodiment, there is a preferred error event associated with each of the 15 possible syndromes within a codeword. The preferred error events are considered "locally minimized", since their associated event weight is a minimum value for the associated parity syndrome. Each of the preferred error events comprises an error event step in a trellis diagram. Overall, the various aspects of the present invention may be applied to codewords comprising one or more parity bits. FIG. 2 provides a representative embodiment illustrating the use of a Meta-Viterbi algorithm using codewords having an exemplary four bits of parity.

The preferred set of error events for the kth codeword may be denoted by the following equation:

$$H = \{e_\pi \text{ for } \forall\ \pi \in \{0,\ 1\}^t, \pi \neq 0 | e_\pi$$
$$= \underset{x \in \Omega}{\arg\min}\ w(x), \Omega$$
$$= \{x \in G*(v), \Phi(x) = \pi\}\}.$$

The events in H may be ordered in sequence based on the parity syndromes they produce and may be represented by the following equation:

$$H=\{e_1,e_2,e_3,\ldots e_{2^t-1}\},$$

where $\Phi(e_1)=(0\ldots 001)\in\{0,1\}^t, \Phi(e_2)=(0\ldots 010), \Phi(e_3)=(0\ldots 011)$, etc.

The event weights associated with each preferred error event may be ordered according to the parity syndromes produced as follows:

$$\{w(e_1), w(e_2), \ldots, w(e_{2^t-1})\}.$$

The Meta-Viterbi Algorithm, as executed by the Non-ISI Meta-Viterbi detector, charts various subsets of each of the preferred sets of error events by way of a Meta-Viterbi trellis diagram. As may be visualized using the Meta-Viterbi trellis diagram, every subset of $H_k$ corresponds to a path through the Meta-Viterbi trellis.

FIG. 3A is a table illustrating the computation of cumulative parity and cumulative weight of a subset of error events (subset of $H=\{e_1,e_2,\ldots,e_{15}\}$) associated with a four-bit parity codeword, in accordance with an embodiment of the invention. The subset of error events comprises $\{e_3, e_7, e_{10}, e_{15}\}$. The exemplary path shown in FIG. 3A corresponds to a sequence of error event steps—"no $e_1$", "no $e_2$", "$e_3$", "no $e_4$", "no $e_5$", etc. The Meta-Viterbi path taken corresponds to a series of error event decisions made at each step of the sequence. The second row of the table provides the event parity associated with the error event that is taken. The third row of the table provides the event weight associated with the error event that is taken. The fourth row provides the cumulative parity at each step of the trellis path based on the error events taken. The fifth row provides the cumulative event weight at each step of the 16 state Meta-Viterbi trellis diagram. The Meta-Viterbi trellis comprises $2^t$ states and in this embodiment, t=4. Each event parity corresponds to an associated event weight. By way of using the Meta-Viterbi trellis, the path that provides the smallest cumulative event weight for a codeword is chosen given the codeword's parity syndrome. This path corresponds to an optimal set of error events that corrects the output provided by the symbol detector (e.g., slicer).

FIG. 3B is a diagram illustrating the 16 state Meta-Viterbi trellis path taken when the error events chosen correspond to $\{e_3, e_7, e_{10}, e_{15}\}$, as described in relation to FIG. 3A, in accordance with an embodiment of the invention. Alternatively, the sequence of event choice steps which forms a path through the trellis may be indicated as follows: "No $e_1$, No $e_2$, $e_3$, No $e_4$, No $e_5$, No $e_6$, $e_7$, No $e_8$, No $e_9$, $e_{10}$, No $e_{11}$, No $e_{12}$, No $e_{13}$, No $e_{14}$, $e_{15}$". The path corresponds to the cumulative parity as displayed by the fourth row of the table illustrated in FIG. 3A. The path shown is only one representative embodiment of a path taken through the 16 state Meta-Viterbi trellis. As illustrated, the path ends With a cumulative parity equal to "0001". The path through the Meta-Viterbi trellis determines the set of error events that may be used to correct the received codeword generated by the symbol detector. The path taken comprises a path ending with a cumulative parity corresponding to the syndrome of the codeword.

Figure 4:
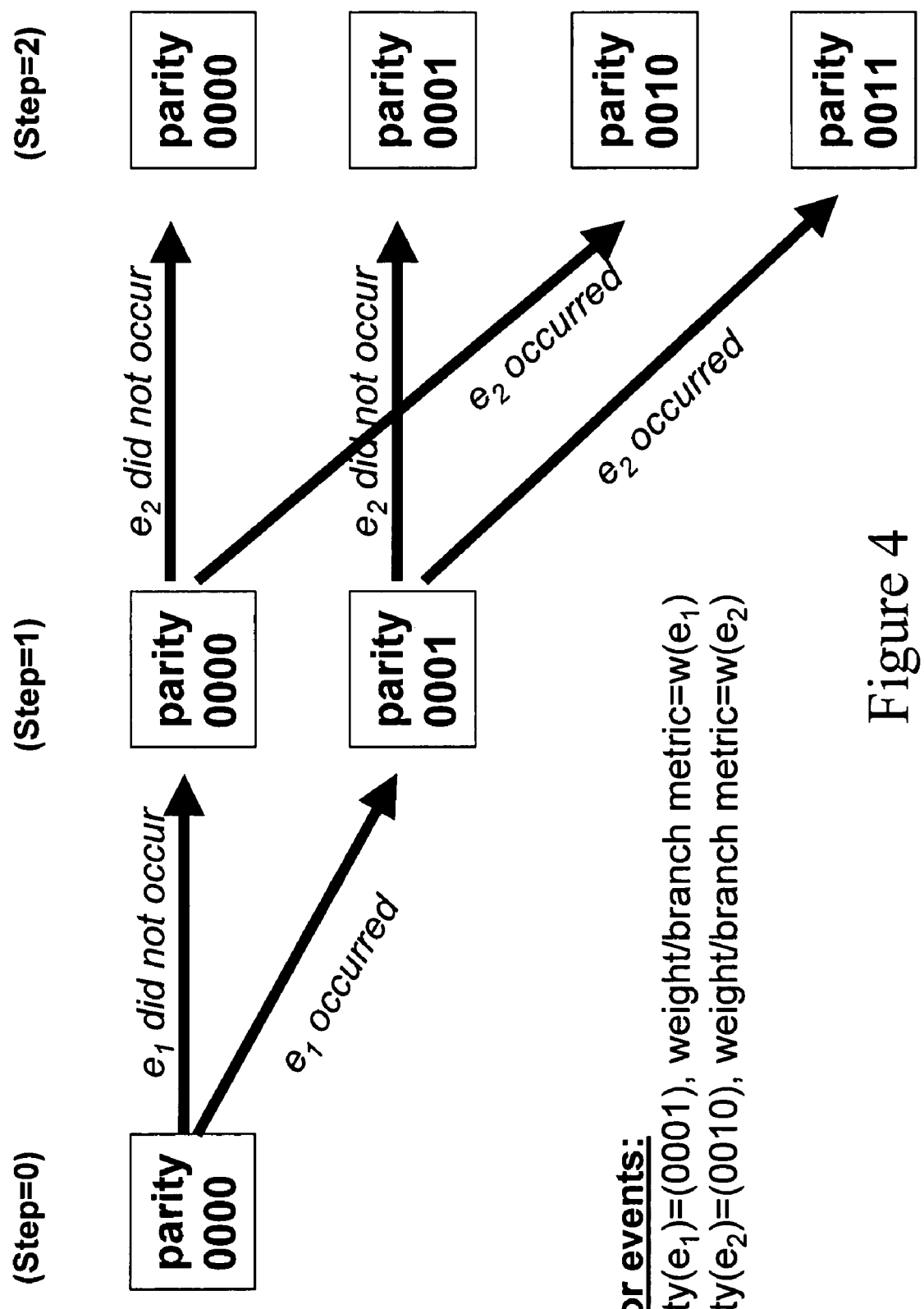
FIG. 4 illustrates a portion of a Meta-Viterbi trellis diagram in accordance with an embodiment of the invention.

FIG. 4 illustrates a diagram of a Meta-Viterbi trellis diagram in accordance with an embodiment of the invention. As shown, step=0 is the starting point for all paths of a four-bit parity codeword. The various states (or cumulative parity) and associated event weights (or path metrics) are listed for the three steps illustrated in FIG. 4. The following three steps list the states, path memory, and path metric associated with each step of a codeword of a received sequence of codewords, for a 16 state Non-ISI Meta-Viterbi detector:

Step 0:

State (0000): path memory={}, path metric=0

Other 15 states (0001) through (1111) are invalid

Step 1:

State (0000): path memory={}, path metric=0

State (0001): path memory=$\{e_1\}$, path metric=$w(e_1)$

Other 14 states are invalid

Step 2:

State (0000): path memory={}, path metric =0

State (0001): path memory=$\{e_1\}$, path metric=$w(e_1)$

State (0010): path memory=$\{e_2\}$, path metric=$w(e_2)$

State (0011): path memory=$\{e_1,e_2\}$, path metric=$w(e_1)+w(e_2)$

Other 12 states are invalid

As we progress through the steps, all 16 states become valid and we start performing ACS operations in a similar fashion as may be performed using the Viterbi Algorithm. The ACS operations allow elimination of "non-survivor" paths when determining the path having the least cumulative event weight.

Figure 5:
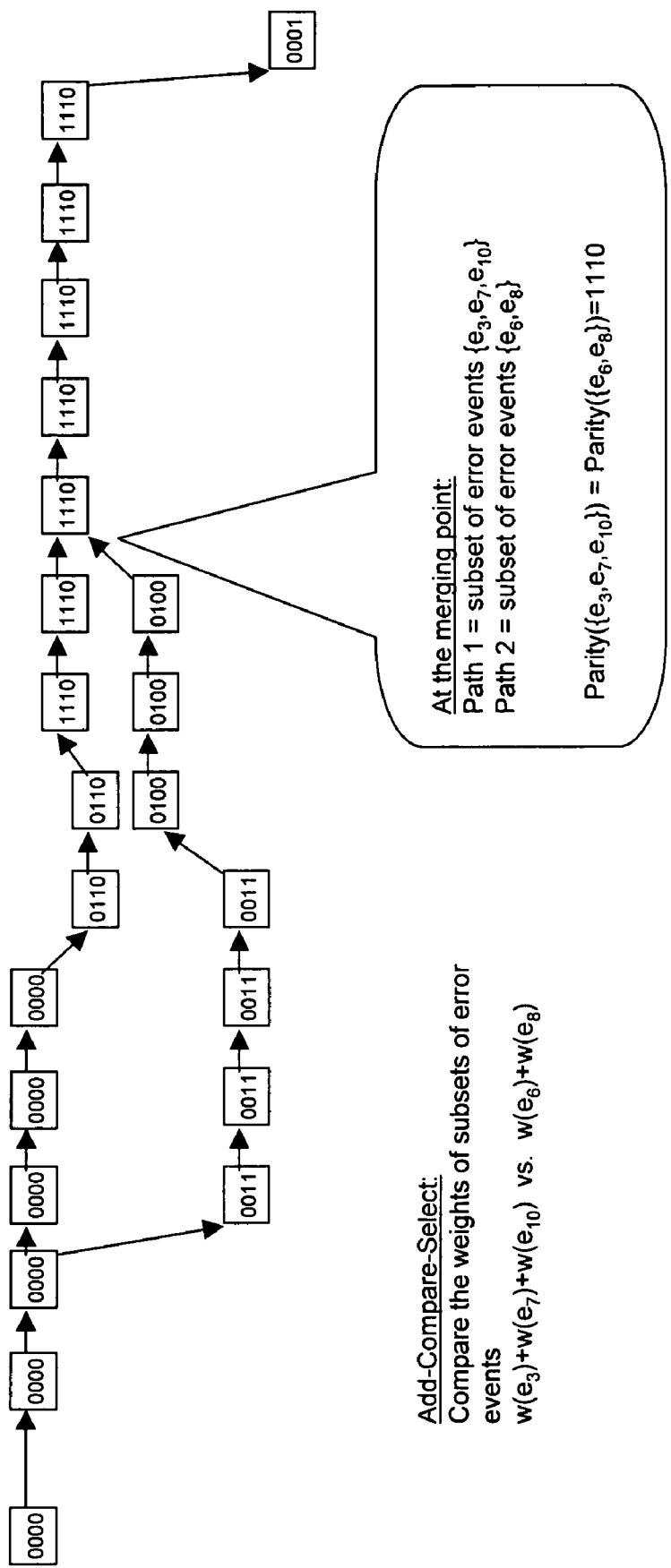
FIG. 5 is a diagram illustrating the selection of a path having lowest cumulative event weight, when two paths merge in a Meta-Viterbi trellis, in accordance with an embodiment of the invention.

FIG. 5 is a diagram illustrating the selection of a path having lowest cumulative event weight, when two paths merge in a Meta-Viterbi trellis, in accordance with an embodiment of the invention. As may be seen, the cumulative parity is the same for the two paths (1110). However, their associated cumulative weights may differ. For the first path, the cumulative weight is equal to $w(e_3)+w(e_7)+w(e_{10})$ while in the second path, the cumulative weight is equal to $w(e_6)+w(e_8)$. At the merge point illustrated, each respective path has undergone a sequence of different error events. In one instance, the path comprises the error events $\{e_3, e_7, e_{10}\}$ while in the other instance, the path comprises the error events $\{e_6, e_8\}$. However, at the end of the path, the two paths meet with the same cumulative parity. The Non-ISI Meta-Viterbi detector performs an add, compare, and select (ACS) operation similar to that performed by the Viterbi Algorithm. This process allows elimination of "non-survivor" paths when determining the path with the lowest path metric or lowest cumulative event weight. The Non-ISI Meta-Viterbi detector may utilize the following pseudo-language sequence of steps which may be used to implement a state machine for performing the Meta-Viterbi Algorithm when constructing a trellis within a codeword:

---

Meta Viterbi algorithm for: State=r(Step=j)

The predecessor states are
  State=$r_1$ (Step=j–1)
  State=$r_2$ (Step=j–1)
  where $r_1 = r \oplus \Phi(e_j), r_2 = r$,
If neither predecessor is valid, the State=r(Step=j) is declared not valid
If only one predecessor State=$r_1$ (Step=j–1) is valid, set
  PathMemory(State=r, Step=j) = $\{e_j\}$
  U PathMemory(State=$r_1$, Step=j–1)  (2)
  PathMetric(State=r, Step=j) = $w(e_j)$ +
  PathMetric(State=$r_1$, Step=j–1)  (3)
If only one predecessor State=$r_2$ (Step=j–1) is valid, set
  PathMemory(State=r, Step=j) =
  PathMemory(State=$r_2$, Step=j–1)  (4)
  PathMetric(State=r, Step=j) =
  PathMetric(State=$r_2$, Step=j–1)  (5)
If both predecessors are valid perform, compare:
  $w(e_j)$ +PathMetric(State=$r_1$, Step=j–1) vs.
  PathMetric(State=$r_2$, Step=j–1)
  If the left-hand-side is smaller, perform (2) and (3), otherwise perform
  (4) and (5).

---

As indicated in the pseudo-language above, the Meta-Viterbi algorithm determines the sequence of error events by using the PathMemory variable. The Meta-Viterbi algorithm determines the path metric or cumulative event weight by using the PathMetric variable. When the paths merge, the Meta-Viterbi algorithm performs a comparison between the two path metrics associated with the two paths. It determines the path metric that has the smaller value and subsequently stores the associated sequence of error events and path metric. Since we need to enforce the parity of the codeword, at Step=$2^r$-1 only State=$\pi$ is valid.

Figure 6:
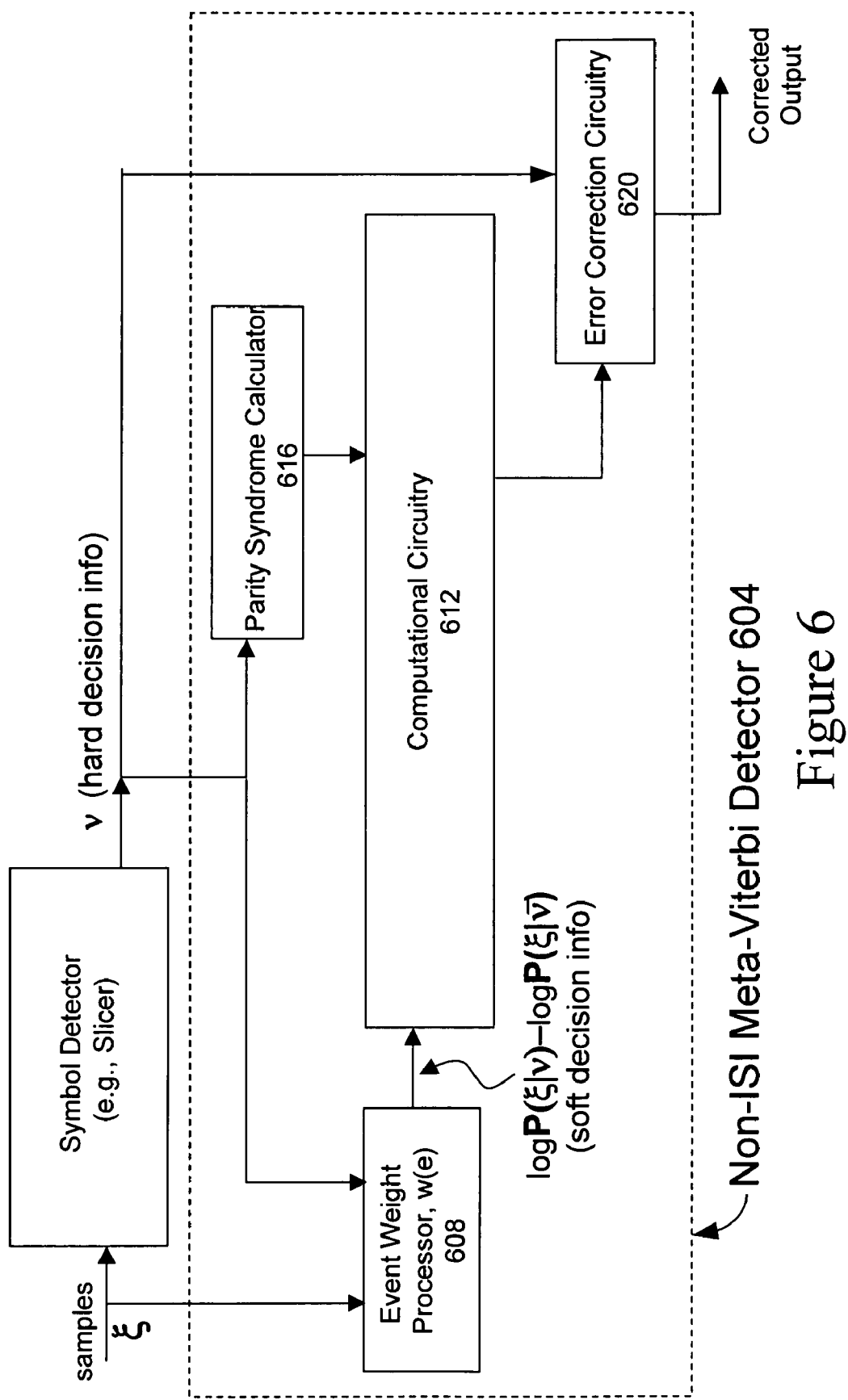
FIG. 6 is a functional block diagram of a Non-ISI Meta-Viterbi detector in accordance with an embodiment of the invention.

FIG. 6 is a functional block diagram of a Non-ISI Meta-Viterbi detector 604 in accordance with an embodiment of the invention. The Non-ISI Meta-Viterbi detector 604 comprises an event weight processor 608, a computational circuitry 612, a parity syndrome calculator 616, and an error correction circuitry 620. The event weight processor 608 is capable of computing one or more event weights, w(e), of a trellis. As mentioned earlier, the event weight may be computed using the following equation:

$$w(e) = \log P(\xi|v) - \log P(\xi|v+e).$$

Further, the soft decision output may be expressed as follows:

$$\log P(\xi_i|v_i) - \log P(\xi_i|\bar{v}_i), \text{ for } i=1, \ldots, \chi,$$

in which $\bar{v}_i$ denotes the complement of the bit $v_i$. This equation may be further simplified when the noise introduced by the channel is AWGN. In the case of additive white Gaussian noise (AWGN), this soft decision output is equal to $-(\xi_i - v_i)^2 + (\xi_i - \bar{v}_i)^2$. The computational circuitry 612 is capable of computing one or more parameters associated with a Meta-Viterbi trellis. The symbol detector (e.g., slicer) provides hard decision information which is used by the event weight processor 608. The symbol detector also provides the hard decision information used by the parity syndrome calculator 616. The event weight processor 608 uses as inputs, the hard decision output provided by the symbol detector and the one or more noisy received codewords, $\xi$. The computational circuitry 612 determines the error events that have the smallest event weights for each parity syndrome of a particular received codeword. The parity syndrome calculator 616 computes the parity syndrome values associated with the one or more received codewords. The parity syndrome calculator 616 processes the output provided by the symbol detector and outputs the parity syndrome values to the computational circuitry 612. As illustrated, the computational circuitry 612 receives event weights computed by the event weight processor 608 and the values calculated by the parity syndrome calculator 616. The computational circuitry 612 may determine one or more optimal paths taken using a trellis diagram. One of the one or more optimal paths corresponds to a path having minimum cumulative event weight. The computational circuitry 612 may compute the cumulative parity of the sequence of error events. The computational circuitry 612 may perform one or more ACS operations when determining one or more cumulative event weights of one or more paths in the trellis diagram. The computational circuitry 612 may compute one or more event weights associated with one or more error events of a codeword. Additionally, the computational circuitry 612 may compute one or more cumulative event weights associated with one or more codewords. The error correction circuitry 620 corrects the one or more received codewords by determining the appropriate set of error events to add to the one or more received codewords. The error correction circuitry 620 may utilize the set of error events associated with the optimal path having a minimum cumulative event weight. The event weight processor 608, computational circuitry 612, parity syndrome calculator 616, and error correction circuitry 620 may comprise any type of digital logic circuitry used to implement an appropriate state-machine.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A method of detecting and correcting data bit errors in one or more received codewords transmitted through a communication channel comprising:
   first processing said one or more received codewords using a symbol detector;
   generating an output from said symbol detector; and
   second processing said output using a detector having $2^t$ states, said communication channel providing no intersymbol interference, said output comprising a hard decision output, v, wherein $$v = \underset{x \in \{0,1\}^\chi}{\mathrm{argmax}} \ \log P(\xi|x) = \underset{x \in \{0,1\}^\chi}{\mathrm{argmax}} \sum_{i=1}^{i=\chi} \log P(\xi_i|x_i),$$

said detector providing a soft decision output, $\log P(\xi_i|v_i) - \log P(\xi_i|\overline{v}_i)$, for $i=1, \ldots, \chi$, said $\log P(\xi_i|v_i) - \log P(\xi_i|\overline{v}_i)$, for $i=1, \ldots, \chi$ equating to $-(\chi_i|v_i)^2 + (\chi_i - \overline{v}_i)^2$ if noise added to said communication channel is additive white Gaussian, said detector using said hard and said soft decision outputs to correct said one or more received codewords, wherein a linear operator, $\Phi: \{0,1\}^\chi \rightarrow \{0,1\}^t$, computes the parity syndrome value of said hard decision output such that $\Phi(E) := \Phi(e_1) \oplus \Phi(e_2) \oplus \ldots \oplus \Phi(e_n) = \pi$, wherein the sum of the event weights represented by a set of error events associated with said parity syndrome value has a minimum value.

2. The method of claim 1 wherein one or more preferred error events are determined for each said received codeword such that the following conditions apply:

$$e \in E, \text{ and } \Phi(e) = \pi \neq 0, \text{ and } e = \underset{x \in \Omega}{\mathrm{argmin}} \ w(x),$$
$$\text{where } \Omega = \{x \in G^*(v), \Phi(x) = \pi\}.$$

3. A method of detecting and correcting data bit errors in one or more received codewords transmitted through a communication channel comprising:
   receiving one or more noisy codewords, said one or more noisy codewords comprising noise added to one or more codewords, said one or more codewords generated from a block encoder;
   first processing said one or more received codewords using a symbol detector;
   generating one or more hard decision outputs from said symbol detector; and
   second processing said one or more hard decision outputs with said one or more noisy codewords by a processor, said processor used to generate one or more event weights, said one or more noisy codewords not affected by intersymbol interference (ISI), wherein each of said one or more hard decision outputs is defined by v, wherein $$v = \underset{x \in \{0,1\}^\chi}{\mathrm{argmax}} \ \log P(\xi|x) = \underset{x \in \{0,1\}^\chi}{\mathrm{argmax}} \sum_{i=1}^{i=\chi} \log P(\xi_i|x_i),$$

wherein said one or more event weights comprise soft decision outputs, w(e), and wherein $w(e) = \log P(\xi_i|v_i) - \log P(\xi_i|\overline{v}_i)$, for $i=1, \ldots, \chi$.

4. The method of claim 3 wherein $\log P(\xi_i|v_i) - \log P(\xi_i|\overline{v}_i)$, for $i=1, \ldots, \chi$ equates to $-(\xi_i - v_i)^2 + (\xi_i - \overline{v}_i)^2$ if said noise is additive white Gaussian.

5. The method of claim 4 wherein said hard and said soft decision outputs are used to correct said one or more received codewords.

6. The method of claim 5 wherein a linear operator, $\Phi: \{0,1\}^\chi \rightarrow \{0,1\}^t$, computes the parity syndrome value of each of said hard decision outputs such that $\Phi(E) := \Phi(e_1) \oplus \Phi(e_2) \oplus \ldots \oplus \Phi(e_n) = \pi$, wherein the sum of the event weights represented by said set of error events has a minimum value.

7. The method of claim 6 wherein one or more preferred error events are determined for each said received codewords such that the following conditions apply: $e \in E$, and $\Phi(e) = \pi \neq 0$, and $$e = \underset{x \in \Omega}{\mathrm{argmin}} \ w(x), \text{ where } \Omega = \{x \in G^*(v), \Phi(x) = \pi\}.$$

8. A method of detecting and correcting data bit errors in one or more received codewords transmitted through a communication channel comprising:
   receiving one or more noisy codewords, said one or more noisy codewords comprising noise added to one or more codewords, said one or more codewords generated from a block encoder;

first processing said one or more received codewords using a symbol detector;

generating one or more hard decision outputs from said symbol detector; and second processing said one or more hard decision outputs with said one or more noisy codewords by a processor, said processor used to generate one or more event weights, said one or more noisy codewords not affected by intersymbol interference (ISI), wherein said second processing comprises:

constructing a trellis diagram for each of said one or more received codewords using branches determined from one or more sets of event choice steps;

determining a path of said trellis diagram associated with a minimum cumulative event weight using said one or more event weights; and correcting said each of said one or more received codewords using said one or more event weights.

9. The method of claim 8 wherein said minimum cumulative event weight of said trellis diagram for each of said one or more received codewords is equal to its parity syndrome, said minimum cumulative event weight associated with a preferred set of error events.

10. A system of detecting and correcting data bit errors in one or more received codewords transmitted through a communication channel comprising:

a symbol detector for first processing said one or more received codewords and generating an output; and a detector with $2^r$ states for second processing said output, said communication channel providing no intersymbol interference, said output comprising a hard decision output, $v$, wherein $$v = \arg\max_{x \in \{0,1\}^\chi} \log P(\xi | x) = \arg\max_{x \in \{0,1\}^\chi} \sum_{i=1}^{i=\chi} \log P(\xi_i | x_i),$$

said detector with $2^r$ states providing a soft decision output, $\log P(\xi_i|v_i) - \log P(\xi_i|\bar{v}_i)$, for $i=1, \ldots, \chi$, said $\log P(\xi_i|v_i) - \log P(\xi_i|\bar{v}_i)$, for $i=1, \ldots, \chi$ equating to $-(\xi_i - v_i)^2 + (\xi_i - \bar{v}_i)^2$ if noise added to said communication channel is additive white Gaussian, said detector with $2^r$ states using said hard and said soft decision outputs to correct said one or more received codewords., wherein a linear operator, $\Phi:\{0,1\}^\chi \to \{0,1\}^r$, computes the parity syndrome value of said hard decision output such that $\Phi(E):=\Phi(e_1)\oplus\Phi(e_2)\oplus \ldots \oplus\Phi(e_n)=\pi$, wherein the sum of the event weights represented by a set of error events associated with said parity syndrome value has a minimum value.

11. The system of claim 10 wherein one or more preferred error events are determined for each said received codeword such that the following conditions apply:

$$e \in E, \text{ and } \Phi(e) = \pi \neq 0, \text{ and } e = \arg\min_{x \in \Omega} w(x),$$

$$\text{where } \Omega = \{x \in G^*(v), \Phi(x) = \pi\}.$$

12. A system for detecting and correcting data bit errors in one or more received codewords transmitted through a communication channel comprising:

a symbol detector for:

receiving one or more noisy codewords, said one or more noisy codewords comprising noise added to one or more codewords, said one or more codewords generated from a block encoder, first processing said one or more received codewords, and generating one or more hard decision outputs; and a processor for:

second processing said one or more hard decision outputs with said one or more noisy codewords, and generating one or more event weights, said one or more noisy codewords not affected by intersymbol interference (ISI), wherein each of said one or more hard decision outputs is defined by $v$, wherein $$v = \arg\max_{x \in \{0,1\}^\chi} \log P(\xi|x) = \arg\max_{x \in \{0,1\}^\chi} \sum_{i=1}^{i=\chi} \log P(\xi_i|x_i),$$

wherein said one or more event weights comprise soft decision outputs, w(e), and wherein $w(e) = \log P(\xi_i|v_i) - \log P(\xi_i|\bar{v}_i)$, for $i=1, \ldots, \chi$.

13. The system of claim 12 wherein $\log P(\xi_i|v_i) - \log P(\xi_i|\bar{v}_i)$, for $i=1, \ldots, \chi$ equates to $-(\xi_i-v_i)^2 + (\xi_i-\bar{v}_i)^2$ if said noise is additive white Gaussian.

14. The system of claim 13 wherein said hard and said soft decision outputs are used to correct said one or more received codewords.

15. The system of claim 14 wherein a linear operator, $\Phi:\{0,1\}^\chi \to \{0,1\}^r$, computes the parity syndrome value of each of said hard decision outputs such that $\Phi(E):=\Phi(e_1)\oplus\Phi(e_2)\oplus \ldots \oplus\Phi(e_n)=\pi$, wherein the sum of the event weights represented by said set of error events has a minimum value.

16. The system of claim 15 wherein one or more preferred error events are determined for each said received codewords such that the following conditions apply:

$$e \in E, \text{ and } \Phi(e) = \pi \neq 0, \text{ and } e = \arg\min_{x \in \Omega} w(x),$$

$$\text{where } \Omega = \{x \in G^*(v), \Phi(x) = \pi\}.$$

17. A system of detecting and correcting data bit errors in one or more received codewords transmitted through a communication channel comprising:

a symbol detector for:

receiving one or more noisy codewords, said one or more noisy codewords comprising noise added to one or more codewords, said one or more codewords generated from a block encoder, first processing said one or more received codewords, and generating one or more hard decision outputs; and a processor for:

second processing said one or more hard decision outputs with said one or more noisy codewords, and generating one or more event weights, said one or more noisy codewords not affected by intersymbol interference (ISI), wherein said second processing comprises:

constructing a trellis diagram for each of said one or more received codewords using branches determined from one or more sets of event choice steps;

determining a path of said trellis diagram associated with a minimum cumulative event weight using said one or more event weights; and correcting said each of said one or more received codewords using said one or more event weights.

18. The system of claim 17 wherein said minimum cumulative event weight of said trellis diagram for each of said one or more received codewords is equal to its parity syndrome, said minimum cumulative event weight associated with a preferred set of error events.

* * * * *